(No Model.)
W. E. GOOD.
STEAM ENGINE.
No. 536,468. Patented Mar. 26, 1895.
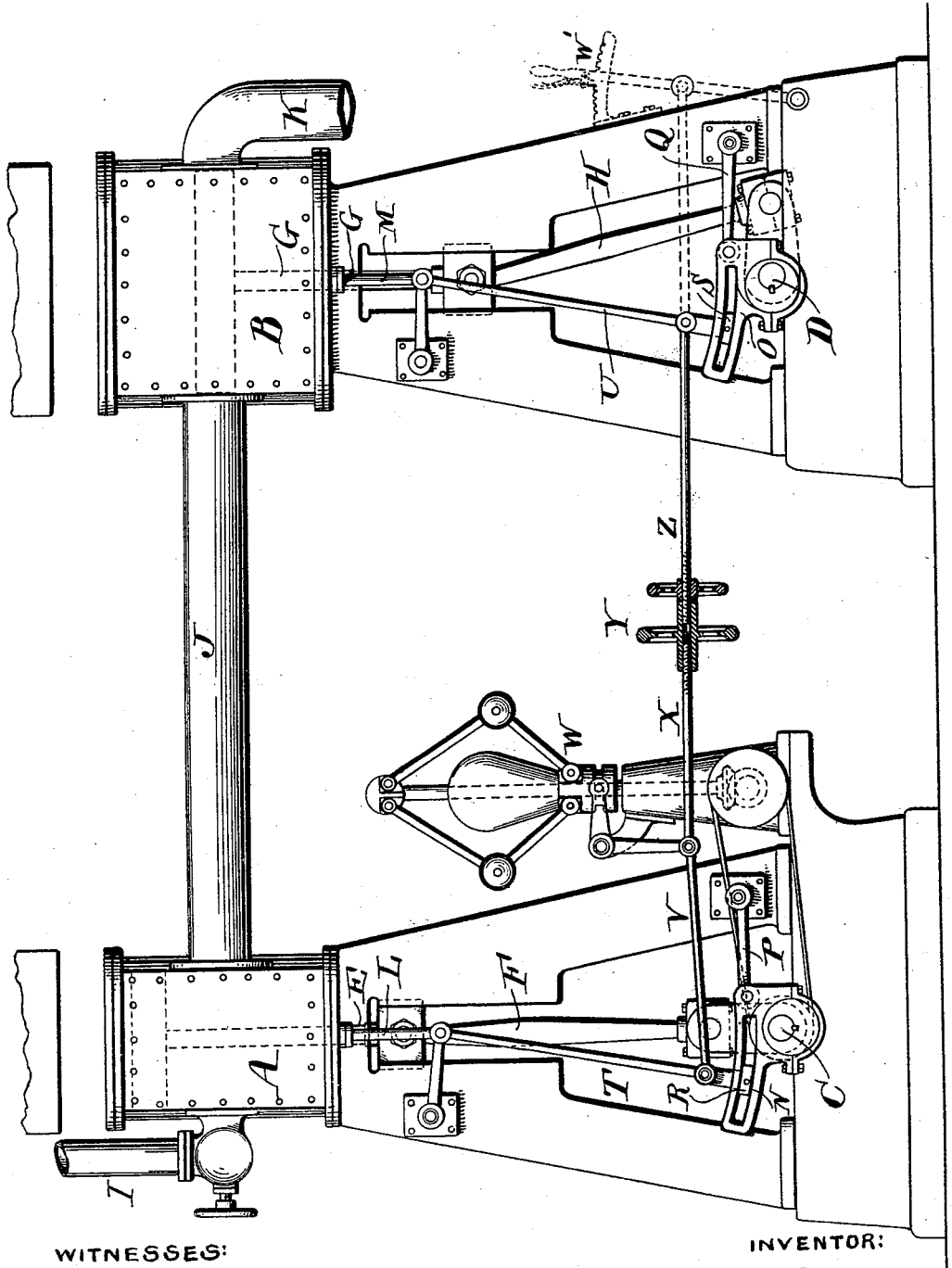
WITNESSES:
Henry Drury
J. H. Russell.
INVENTOR:
William E. Good
by his atty
Francis T. Chambers

UNITED STATES PATENT OFFICE.

WILLIAM E. GOOD, OF PHILADELPHIA, PENNSYLVANIA, ASSIGNOR TO THE SOUTHWARK FOUNDRY AND MACHINE COMPANY, OF SAME PLACE.

STEAM-ENGINE.

SPECIFICATION forming part of Letters Patent No. 536,468, dated March 26, 1895.

Application filed August 15, 1892. Serial No. 443,147. (No model.)

*To all whom it may concern:*

Be it known that I, WILLIAM E. GOOD, of the city and county of Philadelphia, State of Pennsylvania, have invented a certain new and useful Improvement in Steam-Engines, of which the following is a true and exact description, reference being had to the accompanying drawing, which forms a part of this specification.

My invention relates to the construction of steam engines and more particularly to the compounding of two or more independent engines, that is to say, engines disconnected in their reciprocating or rotating parts, the object of my invention being to so combine such engines as to secure an economical and efficient use of steam both in the high and low pressure cylinders.

The nature of my improvement will be best understood as described in connection with the drawing in which it is illustrated, and which represents two independent engines, one of which is actuated by the exhaust steam from the other, and which are combined in accordance with my invention.

A and B represent respectively the high and low pressure cylinders on the two engines; C and D, the respective crank-shafts, and E and F, the piston rod and connecting rod of the high pressure engine; G and H, the piston rod and connecting rod of the low pressure engine.

I indicates a pipe leading from a boiler (not shown) to the high pressure engine; J, a conduit or receiver connecting the high and low pressure engines; K, a conduit leading from the low pressure engine B either to an exhaust or a third engine as may be desired.

L indicates the valve actuating rod of the high pressure engine.

N and O are links on the shafts C and D and both secured on eccentrics in the usual way, and connected with pivoted rods P and Q.

R and S are sliding blocks moving in grooves on the links. T and U are connecting rods leading from the sliding blocks to the valve rods L and M.

W, is a governor which is connected with the sliding block R by a rod V, the function being the usual one of regulating the admission of steam to the cylinder A in accordance with the load or work upon the engine.

In all of the above parts the engines shown are of a familiar and well understood construction.

I connect the sliding blocks R and S together by means of rods V, X and Z, the compound connecting rod made up of these or any other convenient parts being made adjustable in length as by a device such as is indicated at Y. This connecting rod between the two sliding blocks insures that both blocks will be moved and will shorten or increase the distance to their respective cylinders at the same time and in the same direction, while permitting any desired relative adjustment in the movement of the valves by means of the adjusting device Y. Preferably the rod connecting the sliding blocks is connected with and actuated by a governor W, but the adjustment of the movement of the valves may be made by hand by connecting the rod with an adjusting lever W' as indicated in dotted lines at the right of the drawing.

The valve actuating mechanism shown in the drawing is known as the Pins Fink link gear which I give as one of several well-known and equivalent devices for the same purpose. Indeed, any valve actuating devices can evidently be used in my combination.

It will be seen that in operation the engines, combined as described, will tend to regulate and equalize each other. Thus, for instance, in case the low pressure engine begins to race it will take steam from the receiver faster than it is supplied from the high pressure engine's exhaust. Consequently the back pressure on the high pressure piston will fall and the engine will increase its speed, and this increased speed will in turn cause the governor to shorten the admission of steam to the high pressure engine. On the other hand, as increased work causes the low pressure engine to slow, the pressure in the receiver will increase, increasing also the back pressure on the high pressure engine and thus causing it to slow, and by the action of the governor increasing the steam admission.

Having now described my invention, what I claim as new, and desire to secure by Letters Patent, is—

1. The combination with a high pressure cylinder A of a low pressure cylinder B, a piston in each cylinder actuating independent shafts C and D, a steam conduit or receiver J adapted to conduct steam exhausted from the cylinder A to the cylinder B, valves regulating the admission of steam to each cylinder, independent valve actuating mechanisms, one on each engine, adapted to govern the movements of the valves, and a connection between the said valve actuating devices adapted to act on both at the same time and in the same way.

2. The combination with a high pressure cylinder A of a low pressure cylinder B, a piston in each cylinder actuating independent shafts C and D, a steam conduit or receiver J adapted to conduct steam exhausted from the cylinder A to the cylinder B, valves regulating the admission of steam to each cylinder, independent valve actuating mechanisms, one on each engine, adapted to govern the movements of the valves, a connection between the said valve actuating devices adapted to act on both at the same time and in the same way, and a governor acting through said connection on both the valve actuating devices, substantially as and for the purpose specified.

W. E. GOOD.

Witnesses:
 LISLE STOKES,
 J. H. RUSSELL.